US012667919B2

(12) United States Patent (10) Patent No.: US 12,667,919 B2
Akamine et al. (45) Date of Patent: Jun. 30, 2026

(54) WORKPIECE SUPPORT DEVICE

(71) Applicant: FANUC CORPORATION, Yamanashi (JP)

(72) Inventors: Hiroaki Akamine, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 737 days.

(21) Appl. No.: 18/009,815

(22) PCT Filed: Jun. 29, 2021

(86) PCT No.: PCT/JP2021/024509
§ 371 (c)(1),
(2) Date: Dec. 12, 2022

(87) PCT Pub. No.: WO2022/004708
PCT Pub. Date: Jan. 6, 2022

(65) Prior Publication Data
US 2023/0234173 A1 Jul. 27, 2023

(30) Foreign Application Priority Data
Jul. 3, 2020 (JP) ................................. 2020-115691

(51) Int. Cl.
B23K 37/047 (2006.01)
B23K 37/02 (2006.01)
(52) U.S. Cl.
CPC ........ B23K 37/047 (2013.01); B23K 37/0247 (2013.01)

(58) Field of Classification Search
None
See application file for complete search history.

(56) References Cited

U.S. PATENT DOCUMENTS

2008/0303197 A1* 12/2008 Paquette ............ B23K 37/0461
269/55

FOREIGN PATENT DOCUMENTS

| CN | 203448933 U | * | 2/2014 | |
|----|-------------|---|--------|---|
| CN | 103624470 A | * | 3/2014 | ........... B23K 37/047 |
| CN | 208762589 U | * | 4/2019 | |
| JP | S62054328 U | | 4/1987 | |
| JP | H01159997 U | | 11/1989 | |
| JP | H05005340 U | | 1/1993 | |
| JP | H11114873 A | | 4/1999 | |

(Continued)

OTHER PUBLICATIONS

Translation of JP-2003245779-A (Year: 2003).*

(Continued)

*Primary Examiner* — Elizabeth M Kerr
(74) *Attorney, Agent, or Firm* — Renner, Otto, Boisselle & Sklar, LLP

(57) ABSTRACT
A workpiece support device including a base, an electrically conductive worktable rotatably supported with respect to the base, a motor, a reducer that transmits rotation of the motor to the worktable and reduces a speed of the rotation, and a metal adapter interposed between the worktable and the reducer to separate the worktable and the reducer from each other. The worktable and the adapter are electrically insulated by an insulating coating film formed by a surface treatment on a surface of the worktable or the adapter.

6 Claims, 8 Drawing Sheets

(56)  References Cited

FOREIGN PATENT DOCUMENTS

| | | | | | |
|---|---|---|---|---|---|
| JP | 2003245779 | A | * | 9/2003 | ......... B23K 11/3063 |
| JP | 2004148467 | A | | 5/2004 | |
| JP | 2008229778 | A | * | 10/2008 | ............ B25B 5/087 |
| JP | 2012099507 | A | | 5/2012 | |
| JP | 2017059429 | A | * | 3/2017 | ............ H01R 12/72 |
| JP | 2019048310 | A | | 3/2019 | |
| JP | 2021-030265 | A | | 3/2021 | |
| WO | 2007/070167 | A2 | | 6/2007 | |

OTHER PUBLICATIONS

Translation of JP-2008229778-A (Year: 2008).*
Translation of CN-203448933-U (Year: 2014).*
Translation of CN-103624470-A (Year: 2014).*
Translation of JP-2017059429-A (Year: 2017).*
Translation of CN-208762589-U (Year: 2019).*
"Fanuc Servo Positioner (Positioner for coordinated arc welding robot system) Catalog", Fanuc Corporation, Yamanashi, Japan, Nov. 2015, 8 pages.

* cited by examiner

WORKPIECE SUPPORT DEVICE

TECHNICAL FIELD

The present disclosure relates to a workpiece support device.

BACKGROUND ART

There is a known workpiece support device equipped with a worktable that rotatably supports a workpiece to be welded by an arc welding robot (for example, see PTL 1).

The worktable is made of an electrically conductive material, and electrical power for arc-welding a workpiece mounted thereon is supplied to the worktable via a current-collecting brush. A resin insulating ring is interposed between the worktable and a reducer that drives the worktable in order to prevent welding current from flowing to a motor via the reducer.

In PTL 1, the insulating ring is formed into a ring-plate shape nearly equal in size to the worktable so as to entirely electrically insulate the portion between a shaft portion of the reducer and the worktable fixed to the shaft portion. Furthermore, in order to prevent the welding current going around and flowing in the thickness direction of the insulating ring, the insulating ring is designed to have a large thickness.

CITATION LIST

Patent Literature

{PTL 1}
Japanese Unexamined Patent Application, Publication No. 2019-48310

DESCRIPTION OF EMBODIMENTS

A workpiece support device 1 according to an embodiment of the present disclosure will now be described with reference to the drawings.

In a workpiece support device, as a size of a worktable increases, a size of an insulating ring also increases. Insulating rings made of a resin that has both high rigidity and high insulating properties, for example, Bakelite, are difficult to produce and become more expensive as the size increases.

Thus, it is desirable to achieve more reliable electrical insulate of the worktable relative to the motor at low cost.

An aspect of the present disclosure is a workpiece support device including: a base; an electrically conductive worktable rotatably supported with respect to the base; a motor; a reducer that transmits rotation of the motor to the worktable and reduces a speed of the rotation; and a metal adapter interposed between the worktable and the reducer to separate the worktable and the reducer from each other, wherein the worktable and the adapter are electrically insulated by an insulating coating film formed by a surface treatment on a surface of the worktable or the adapter.

A workpiece support device 1 according to an embodiment of the present disclosure will now be described with reference to the drawings.

Figure 1:
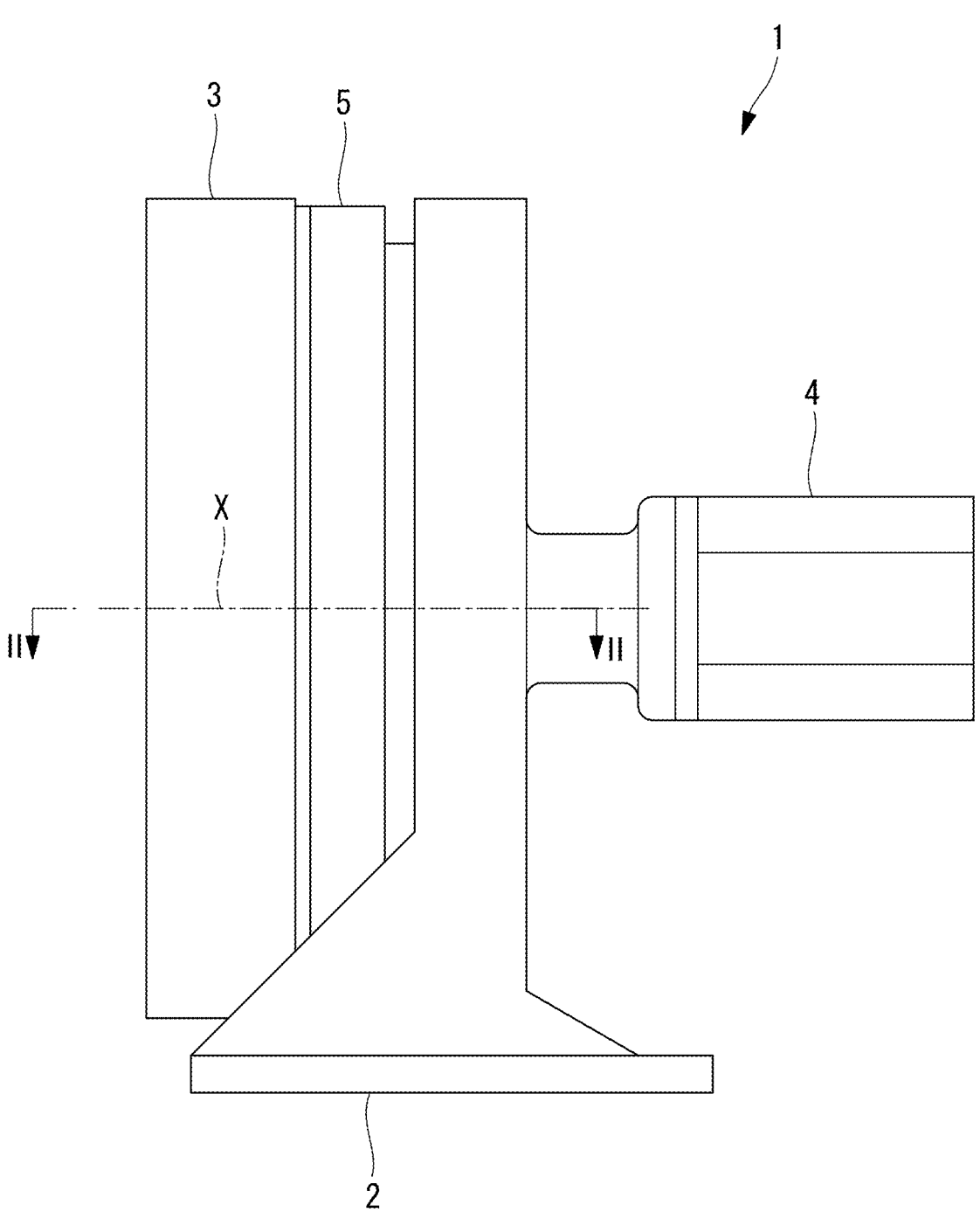
FIG. 1 is a side view of a workpiece support device according to an embodiment of the present disclosure.
Figure 2:
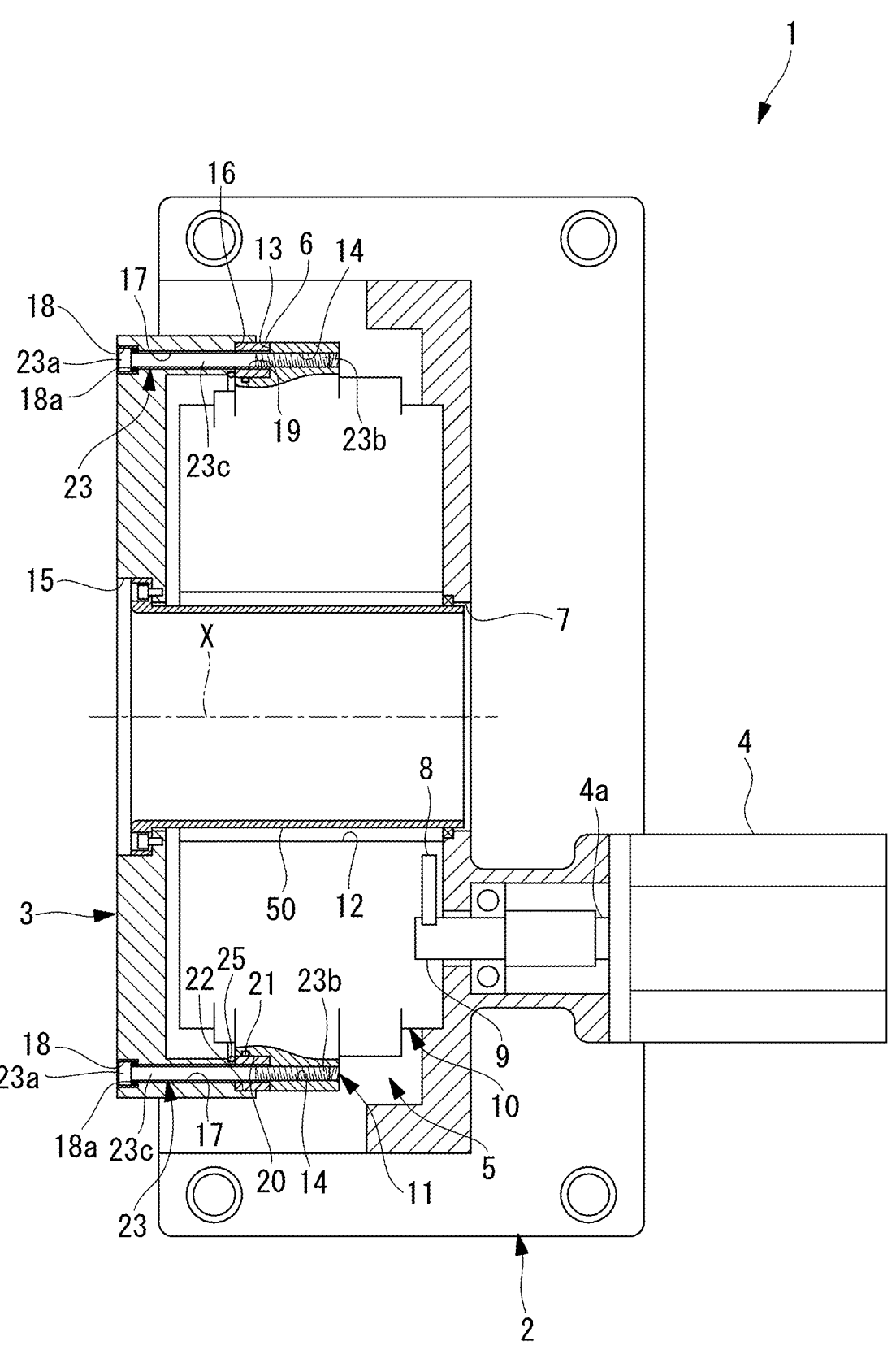
FIG. 2 is a cross-sectional view of the workpiece support device illustrated in FIG. 1 taken along line II-II.

As illustrated in FIGS. 1 and 2, a workpiece support device 1 according to this embodiment is equipped with a base 2 to be installed on the floor, a worktable 3 supported so as to be rotatable with respect to the base 2 about a horizontal rotation axis X, a motor 4, and a reducer 5 that reduces the rotation speed of the motor 4 and transmits the reduced rotation to the worktable 3. In this embodiment, an adapter 6 is disposed between the worktable 3 and the reducer 5.

The base 2 is equipped with a power supply (not illustrated) that supplies welding power to the worktable 3. A round through hole 7 that penetrates in the rotation axis X direction through a region of the worktable 3 that includes the rotation axis X is formed in the base 2.

The worktable 3 is made of an electrically conductive material.

The motor 4 is fixed to the base 2, and a pinion gear (toothed gear) 9 that meshes with an input gear 8 of the reducer 5 is fixed to a motor shaft 4a.

The reducer 5 is equipped with a fixed portion 10 fixed to the base 2, and a movable portion 11 rotatably supported about the rotation axis X with respect to the fixed portion 10.

In this embodiment, the fixed portion 10 is constituted by a shaft disposed at the radially inner side, and one end surface of the fixed portion 10 in the rotation axis X direction is fixed to the base 2. The fixed portion 10 has a hollow hole 12 that penetrates along the rotation axis X and that is formed at a position coincident with the through hole 7 in the base 2.

The movable portion 11 is constituted by an annular casing disposed on the radially outer side with respect to the shaft, and an annular flange surface 13 constituted by a flat surface orthogonal to the rotation axis X is disposed on the surface side. The flange surface 13 has multiple screw holes 14 for fixing the worktable 3. The screw holes 14 extend parallel to the rotation axis X and are spaced from each other in the circumferential direction.

The worktable 3 is designed to have a disk shape that covers the movable portion 11 and the other end surface of the fixed portion 10 in the rotation axis X direction. The worktable 3 has a through hole 15 at a position coincident with the hollow hole 12 in the fixed portion 10.

In this manner, a space that extends from the surface of the worktable 3 to the rear surface of the base 2 is formed in the region that includes the rotation axis X. A cylindrical pipe 50 inserted into this space is fixed to the worktable 3. Since the position of the space in the pipe 50 remains the same even when the worktable 3 is rotated about the rotation axis X, a cable and other parts can be passed through from the rear surface side of the workpiece support device 1 to the surface of the worktable 3 through the interior of the pipe 50.

The worktable 3 has, on the rear surface side thereof, an annular flange surface 16 constituted by a flat surface orthogonal to the rotation axis X. The worktable 3 has multiple bolt through holes (through holes) 17 extending from the surface side to the flange surface 16 on the rear surface. The bolt through holes 17 are at positions coincident with the screw holes 14 in the movable portion 11. Each of the bolt through holes 17 includes a counterbore 18 that accommodates a head 23a of a bolt 23. The counterbore 18 is disposed on the surface side of the worktable 3.

The adapter 6 has a particular thickness and an annular shape, and is interposed between the flange surface 13 of the movable portion 11 of the reducer 5 and the flange surface 16 of the worktable 3.

The adapter 6 has multiple bolt through holes (through holes) 19 penetrating therethrough in the thickness direction at positions coincident with the screw holes 14 in the movable portion 11 and the bolt through holes 17 in the worktable 3.

In this embodiment, the adapter 6 has an insulating coating film formed by a surface treatment, and the insulating coating film covers all the surfaces of the body member of the adapter 6 made of metal materials, that is, all outer peripheral surfaces, all inner peripheral surfaces, all end surfaces in the thickness direction, and all inner surfaces of the bolt through holes 19. The insulating coating film is, for example, formed by deposition of insulating particles by a known electrochemical reaction, and has high insulating performance.

The inner peripheral surface of the adapter 6 fits with a fitting outer surface 20 formed in the movable portion 11 of the reducer 5 so as to be positioned in the radial direction. In addition, the inner peripheral surface of the adapter 6 and the fitting outer surface 20 of the movable portion 11 that are fitted with each other are sealed with an O ring 21 disposed therebetween, and an end surface of the adapter 6 and an end surface of the movable portion 11 are sealed with an O ring 25 disposed therebetween. The adapter 6 has a simple shape to facilitate formation of the insulating coating film, and a groove for the O ring 21 is formed in the movable portion 11 to ensure the insulation distance.

The outer peripheral surface of the adapter 6 is positioned in the radial direction by fitting with a fitting inner surface 22 formed in the worktable 3. The outer peripheral surface of the adapter 6 is fitted with the fitting inner surface 22 of the worktable 3, the inner peripheral surface of the adapter 6 is fitted with the fitting outer surface 20 of the movable portion 11 of the reducer 5, and two end surfaces of the adapter 6 in the thickness direction are in close contact with the flange surface 13 of the reducer 5 and the flange surface 16 of the worktable 3.

The length of the fitting inner surface 22 of the worktable 3 is set to be sufficiently smaller than the thickness of the adapter 6, for example, set to a length at least 5 mm shorter than the thickness of the adapter 6. In this manner, while the two end surfaces of the adapter 6 in the thickness direction are in close contact with the flange surface 13 of the reducer 5 and the flange surface 16 of the worktable 3, the worktable 3 and the movable portion 11 of the reducer 5 are at least 5 mm apart from each other.

Then, bolts 23 inserted into the bolt through holes 17 and 19 in the worktable 3 and the adapter 6 from the surface side of the worktable 3 are fastened into the screw holes 14 in the movable portion 11 of the reducer 5 so that the worktable 3 is fixed to be positioned with respect to the movable portion 11 of the reducer 5 in the radial direction and in the rotation axis direction X.

Figure 3:
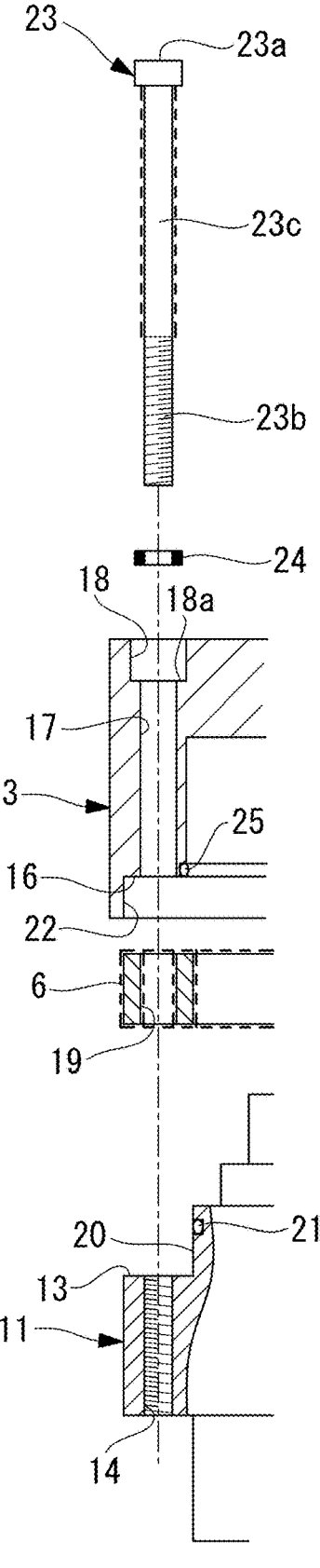
FIG. 3 is an exploded vertical cross-sectional view of some constituent parts of the workpiece support device illustrated in FIG. 1.
Figure 4:
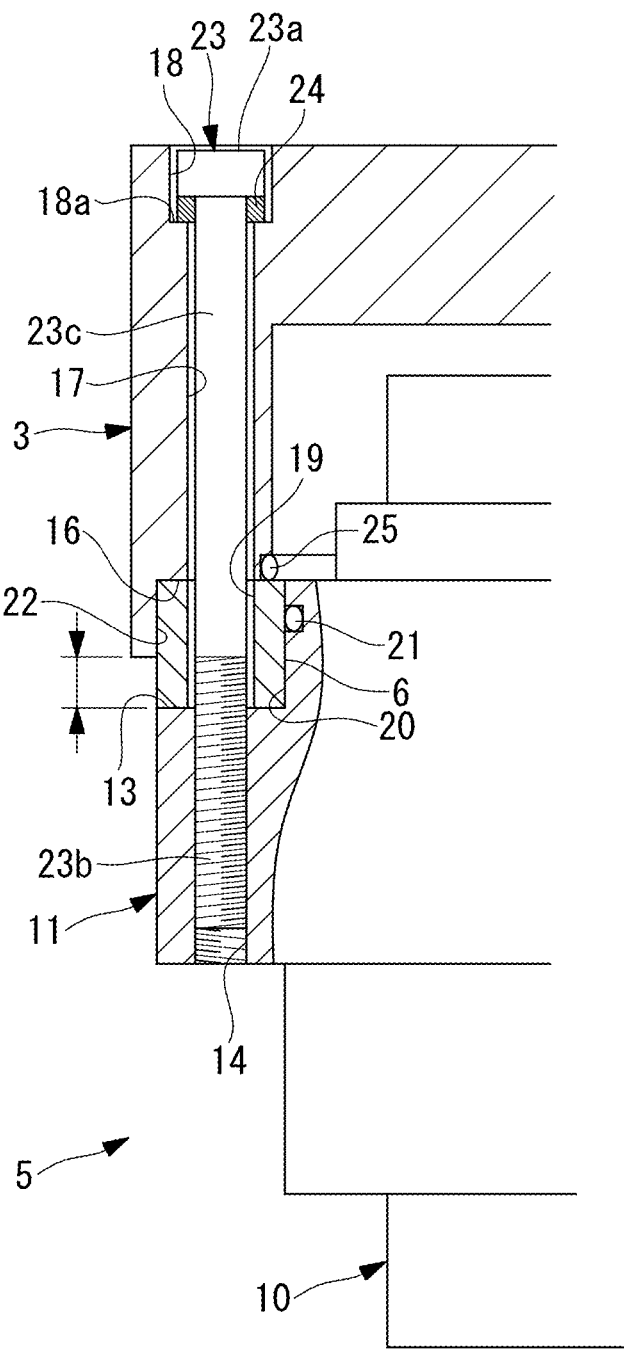
FIG. 4 is a vertical cross-sectional view of a part of the workpiece support device illustrated in FIG. 2.

As illustrated in FIGS. 3 and 4, an insulating washer 24 made of an electrically insulating material is interposed between the head 23a of the bolt 23 and a seating surface 18a of the counterbore 18 in the bolt through hole 17 of the worktable 3. In FIG. 3, thick dotted lines indicate coatings.

Furthermore, the bolt 23 is made of a metal material, and a portion 23c other than a threaded portion 23b below the head is coated with an electrically insulating material along the entire length. The border between the threaded portion 23b and the portion 23c other than the threaded portion 23b is disposed in the bolt through hole 19 in the adapter 6 when the bolt 23 is fastened. The coating may be formed by applying a coating material or by wrapping a sheet.

The advantageous effects of the workpiece support device 1 of this embodiment having the aforementioned features will now be described.

According to the workpiece support device 1 of this embodiment, the orientation of the workpiece can be changed by fixing the workpiece on the surface of the worktable 3 and rotating, via the reducer, the worktable 3 about the rotation axis X by actuating the motor 4. Since power for welding is supplied to the worktable 3 from a power supply (not illustrated), for example, the workpiece can be welded by feeding welding current from a torch attached to a tip of a robot via the workpiece and the worktable 3.

Here, the adapter 6 is disposed between the worktable 3 and the movable portion 11 of the reducer 5, and an insulating coating film is formed on the surface of the adapter 6. As a result, the contact surface between the adapter 6 and the flange surface 16 and the fitting inner surface 22 of the worktable 3, and the contact surface between the adapter 6 and the flange surface 13 and the fitting outer surface 20 of the reducer 5 are electrically insulated.

Furthermore, by fastening the bolts 23 inserted into the bolt through holes 17 in the worktable 3 into the screw holes 14 in the movable portion 11, the worktable 3 and the adapter 6 are together fastened to the movable portion 11 of the reducer 5. In this case, the insulating washer 24 interposed between the head 23a of the bolt 23 and the seating surface 18a of the counterbore 18 electrically insulates the head 23a of the bolt 23 and the worktable 3.

Furthermore, although the portion 23c of the bolt 23 below the head is in proximity to the inner surface of the bolt through hole 17 in the worktable 3, a coating made of an electrically insulating material on the bolt 23 provides electrical insulation. Furthermore, the portion 23c of the bolt 23 below the head is also in proximity to the inner surface of the bolt through hole 19 in the adapter 6; however, the coating made of an electrically insulating material on the bolt 23 and the insulating coating film on the inner surface of the adapter 6 provide electrical insulation. Although the length of the electrically insulating material on the bolt 23 may have a particular variation, such variation is allowable as long as the variation is within the thickness of the adapter 6.

Since the coating below the head of the bolt 23 is provided on the portion 23c other than the threaded portion 23b, the uncoated threaded portion 23b comes into proximity to the inner surface of the bolt through hole 19 when the border between the threaded portion 23b and the portion 23c other than the threaded portion 23b comes inside the bolt through hole 19 in the adapter 6. Since the inner surface of the bolt through hole 19 in the adapter 6 is coated with an insulating coating film, the bolt 23 and the adapter 6 can be electrically isolated from each other even in the threaded portion 23*b* where the metal surface is exposed.

Furthermore, adjusting the thickness of the adapter 6 can increase the distance between the worktable 3 and the movable portion 11 of the reducer 5 to 5 mm or more, and thus electrical conduction between the worktable 3 and the reducer 5 can be prevented despite a build-up of spatter.

As described above, the workpiece support device 1 according to this embodiment does not use a large insulating ring made of an insulating material, such as Bakelite, that is difficult to produce and is expensive, but uses an adapter 6 made of a metal material and coated with an insulating coating film. This provides an advantage in that both high insulating performance and a drastic reduction in production costs can be achieved.

Figure 5:
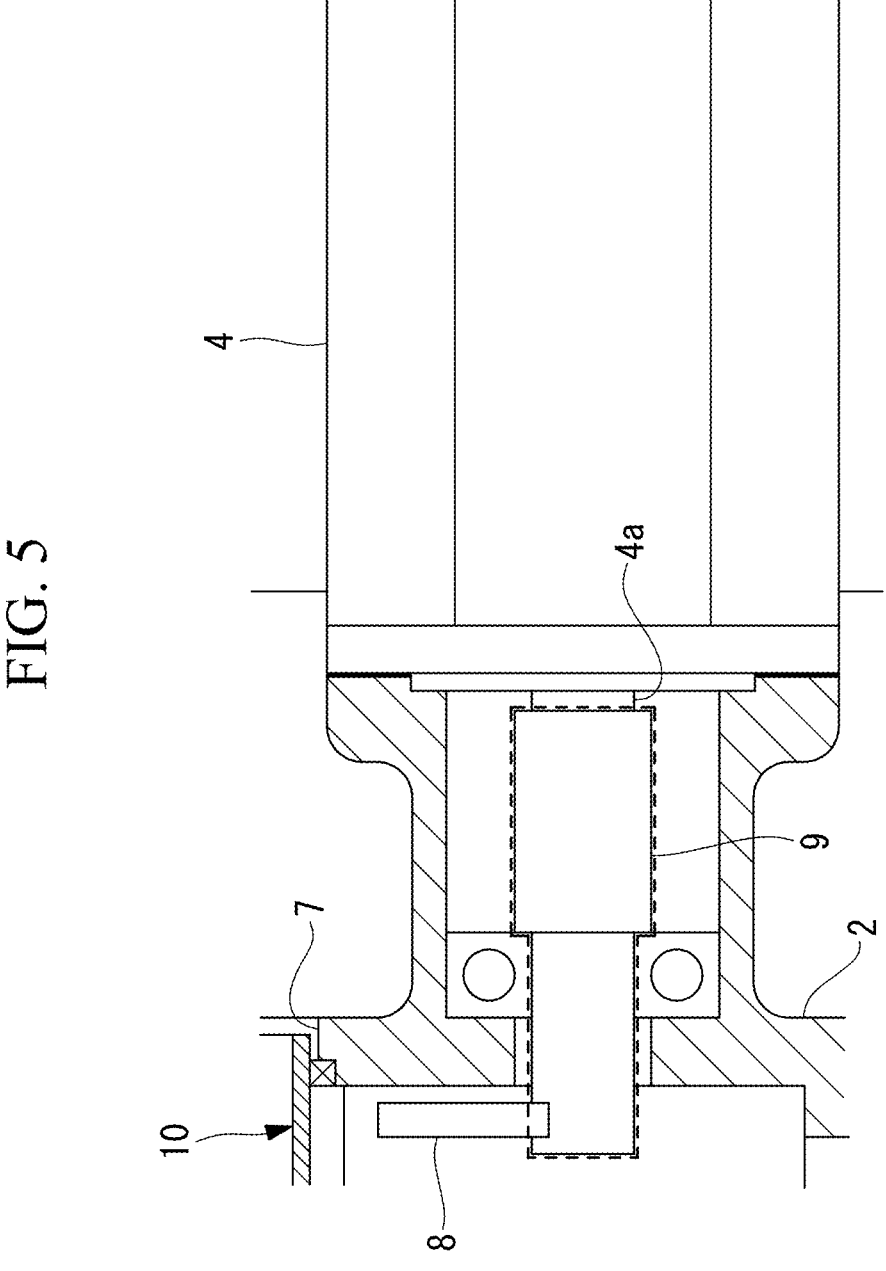
FIG. 5 is a vertical cross-sectional view of some parts of a modification example of the workpiece support device illustrated in FIG. 1.

Alternatively, as illustrated in FIG. 5, the workpiece support device 1 of this embodiment may include, in addition to the aforementioned features, an insulating coating film formed on the surface of the pinion gear 9, which is fixed to the motor shaft 4*a* of the motor 4, by the same surface treatment as the adapter 6. The insulating coating film is to be provided on the entire outer surface of the pinion gear 9, and more reliable insulation can be achieved if the insulating coating film is also provided on the inner surface that fits with the motor shaft 4*a*.

As illustrated in FIG. 5, a sheet made of an electrically insulating material may be interposed between the motor 4 and a motor installation surface of the base 2 for fixing the motor 4. Alternatively, an insulating coating film may be provided on the motor installation surface. This provides an advantage in that even if the welding current leaks from the worktable 3 to the reducer 5, the leaked welding current can be prevented from flowing into the motor 4 via the reducer 5.

Figure 6:
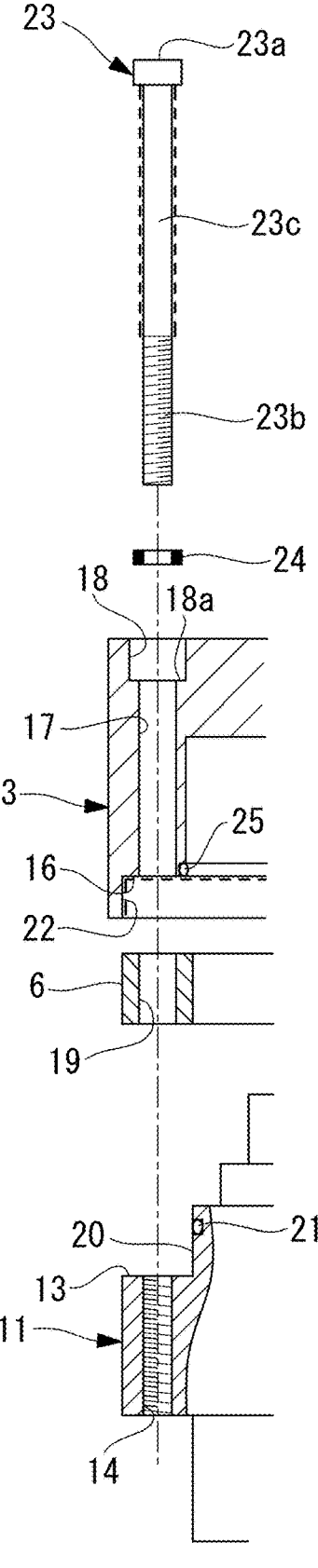
FIG. 6 is a vertical cross-sectional view of some parts of another modification example of the workpiece support device illustrated in FIG. 1.

In this embodiment, the insulating coating film is formed on the entire outer peripheral surface of the adapter 6 and the entire inner surface of the bolt through hole 19; alternatively, as illustrated in FIG. 6, an insulating coating film may be formed on the flange surface 16 and fitting inner surface 22 of the worktable 3.

Figure 7:
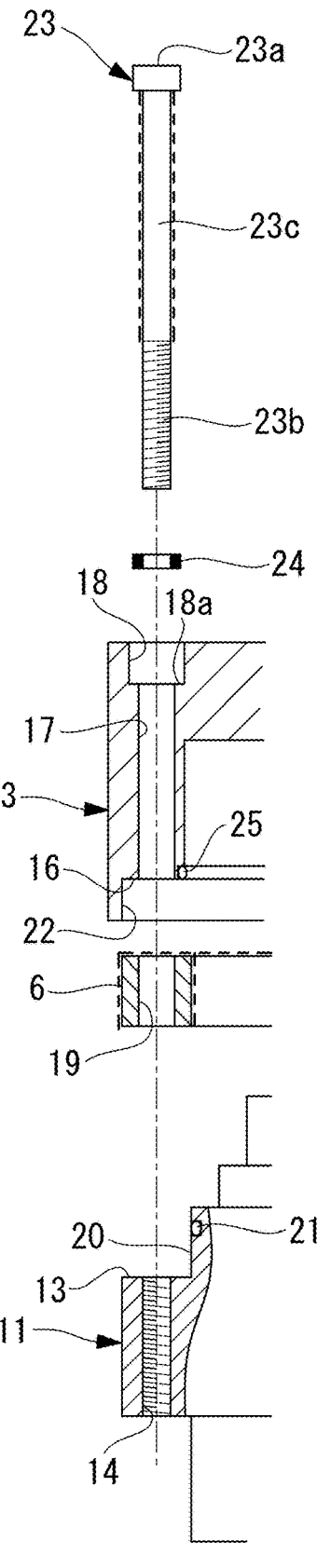
FIG. 7 is a vertical cross-sectional view of some parts of yet another modification example of the workpiece support device illustrated in FIG. 1.

Alternatively, instead of forming the insulating coating film on the entire outer surface of the adapter 6 and the entire inner surface of the bolt through hole 19, as illustrated in FIG. 7, an insulating coating film may be formed only on surfaces other than the end surface that comes into contact with the flange surface 13 of the reducer 5 and the inner surface of the bolt through hole 19.

Figure 8:
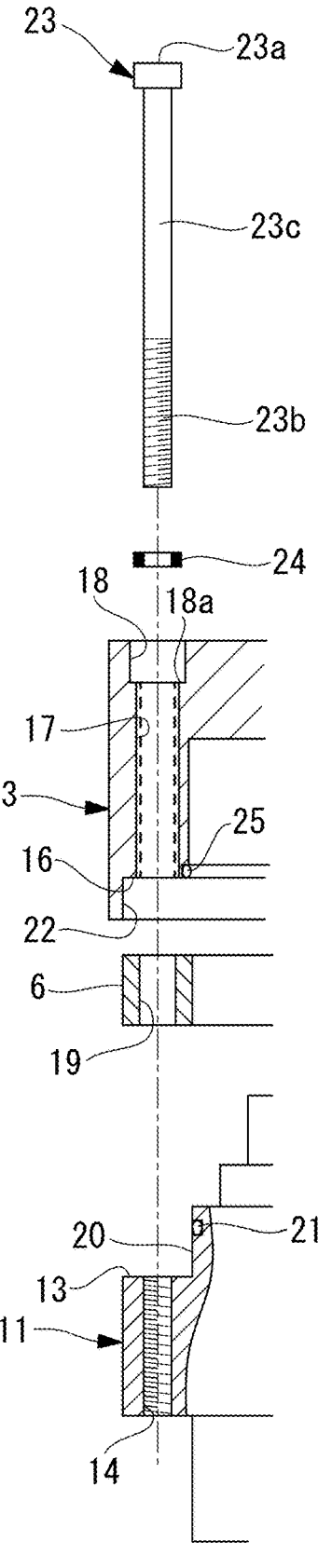
FIG. 8 is a vertical cross-sectional view of some parts of another modification example of the workpiece support device illustrated in FIG. 1.

In this embodiment, an electrically insulating coating is provided on the portion of the bolt 23 below the head; alternatively, as illustrated in FIG. 8, a common bolt 23 not provided with any coating may be used.

In this case, an insulating coating film may be formed in the bolt through hole 17 in the worktable 3 or the inner diameters of the bolt through holes 17 and 19 may be increased to avoid contact between the bolt 23 and the inner surfaces of the bolt through holes 17 and 19.

In this embodiment, counterbores 18 are formed on the surface side of the worktable 3, and the bolts 23 are fastened from the surface side of the worktable 3. In this manner, the worktable 3 can be easily detached by removing the bolt 23 from the surface side of the worktable 3, and thus maintainability can be improved. Alternatively, counterbores 18 may be provided on the rear surface side of the reducer 5, thread holes 14 may be formed on the worktable 3 side, and the bolts 23 inserted from the reducer 5 side may be fastened to the screw holes 14 in the worktable 3.

In this embodiment, a single-axis workpiece support device 1 in which the worktable 3 is rotated about one rotation axis X is described as an example; alternatively, the workpiece support device 1 may be of multi-axis type that has two or more rotation axes X.

The invention claimed is:

1. A workpiece support device comprising:
a base;
an electrically conductive worktable rotatably supported around a rotational axis with respect to the base;
a motor;
a reducer that transmits rotation of the motor to the worktable and reduces speed of the rotation; and
a metal adapter interposed between the worktable and the reducer at a location recessed, in a direction along the rotational axis, from an end surface of the reducer to separate the worktable and the reducer from each other,
wherein the worktable and the adapter are electrically insulated by an insulating coating film formed by a surface treatment on a surface of the worktable or the adapter,
wherein the reducer includes a fixed portion fixed to the base, and a movable portion disposed radially outside of the fixed portion and rotatable around the rotational axis,
wherein the metal adapter is fixed to an annular flange surface extending radially outwardly from an outer peripheral surface of the movable portion, and
wherein a cylindrical portion extending along the rotational axis from the worktable is configured to radially cover a part of the adapter and a part of the movable portion.

2. The workpiece support device according to claim 1, wherein
the adapter has a ring shape and is interposed between the annular flange surface of the cylindrical portion of the reducer and an annular flange surface of the worktable,
the adapter has a contact surface that contacts the worktable and that is provided with the insulating coating film, and
the adapter has a plurality of through holes through which bolts that fasten the worktable and the reducer are inserted, and
wherein the worktable and the reducer are fastened together by the bolts with insulating washers having electrical insulating properties.

3. The workpiece support device according to claim 2, wherein
through holes into which the bolts are inserted and counterbores in which heads of the bolts are disposed are formed in one of the worktable and the reducer,
screw holes in which the bolts are tightened are provided in the other one of the worktable and the reducer, and
the insulating washers are interposed between seating surfaces in the counterbores and the heads of the bolts.

4. The workpiece support device according to claim 3, wherein the through holes in the worktable or the reducer and parts of outer peripheral surfaces of the bolts that are inserted into the through holes or inner peripheral surfaces of the through holes are covered with a coating containing an electrically insulating material or with an insulating coating film.

5. The workpiece support device according to claim 1, wherein the motor is fixed to the base, and the motor and the base are electrically insulated from each other by an electrically insulating material.

6. A workpiece support device comprising:

a base;

an electrically conductive worktable rotatably supported around a rotational axis with respect to the base;

a motor;

a reducer that transmits rotation of the motor to the worktable and reduces speed of the rotation; and a metal adapter interposed between the worktable and the reducer at a location recessed, in a direction along the rotational axis, from an end surface of the reducer to separate the worktable and the reducer from each other, wherein the worktable and the adapter are electrically insulated by an insulating coating film formed by a surface treatment on a surface of the worktable or the adapter, the motor is equipped with a toothed gear that transmits rotations of the motor to the reducer, and an insulating coating film is formed by a surface treatment on a surface of the toothed gear of the motor.

* * * * *